F. E. LAYMAN.
METHOD OF MAKING INSULATING JOINTS.
APPLICATION FILED APR. 19, 1915.

1,178,587.

Patented Apr. 11, 1916.

Inventor
Frank E. Layman
By Frank H. Hubbard
Attorney

UNITED STATES PATENT OFFICE.

FRANK E. LAYMAN, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF MAKING INSULATING-JOINTS.

1,178,587. Specification of Letters Patent. Patented Apr. 11, 1916.

Application filed April 19, 1915. Serial No. 22,415.

*To all whom it may concern:*

Be it known that I, FRANK E. LAYMAN, a citizen of the United States, residing at Milwaukee, in the county of Milwaukee and State of Wisconsin, have invented new and useful Improvements in Methods of Making Insulating-Joints, of which the following is a full, clear, concise, and exact description, reference being had to the accompanying drawing, forming a part of this specification.

This invention relates to an improved method of making insulating joints or couplings.

One of the objects of the invention is to reduce the manufacturing cost and to facilitate the construction of a durable and strong insulating joint.

A further object is to improve the method of making an insulating joint and thereby improve the product.

Other objects and advantages will appear hereinafter in connection with the description of the accompanying drawing, in which—

Figure 1:
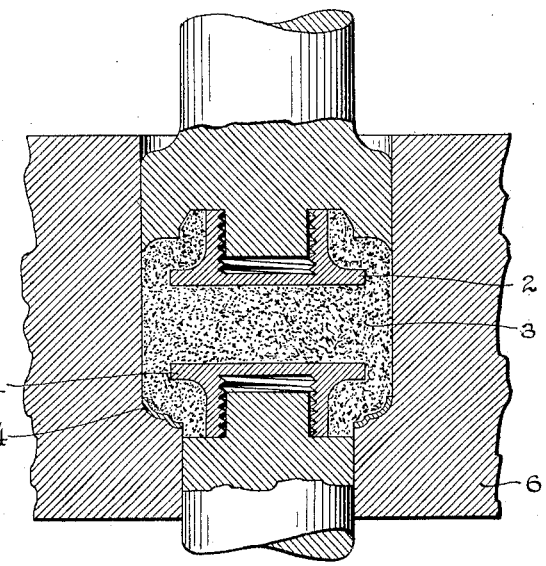
Figure 2:
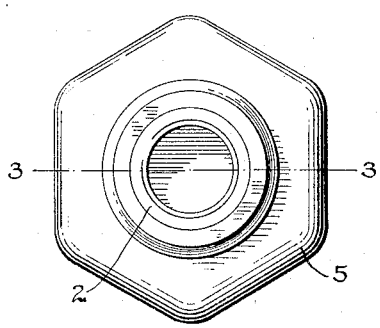
Figure 3:
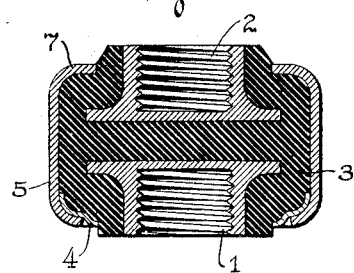

Figure 1 is a sectional view of insulating joint parts arranged in a suitable die preparatory to the molding operation. Fig. 2 is a plan view of a finished joint, and Fig. 3 is a sectional view of the same on the line 3—3 of Fig. 2.

The insulating joint illustrated comprises a pair of metal connecting or coupling members 1 and 2 embedded in a mass of insulation 3 and inclosed in a metal casing consisting of a collar 4 and a shell 5.

In constructing the joint, the collar 4 and coupling member 1 are first positioned in a suitable die 6, then a predetermined amount of the insulating material 3, in a plastic state, is inserted in the die, and the other coupling member 2 is thereafter positioned on the insulation. These parts are thereupon subjected to pressure by operation of the die to compress and mold the insulation about and between the metal inserts and collar. A rigid and strong unit is thus produced, which, it will be noted, includes all the elements of the joint except the shell 5. This unit is then removed from the die and treated to further harden the insulation 3 by a suitable process such as prolonged baking. Finally the shell 5 is applied about the unit and arranged to firmly grip the same for reinforcement and protection of the insulating material. In practice the shell 5 is formed with a contracted flange 7 at one end while its opposite end is left uncontracted to receive the joint unit. When the unit is positioned in the shell the end of the latter is beaded or flanged over the collar 4 into which, as above mentioned, the insulating material has been molded. In this manner the shell is fashioned about the unit after final treatment of the latter and is thereby insured a permanent, snug fit thereon. Moreover by forming the joint in the manner set forth the molding and treatment of the insulation may be accomplished under the most favorable conditions for producing an effective and reliable insulating joint.

What I claim as new and desire to secure by Letters Patent is:—

1. The method of making an insulating joint of the character set forth, consisting in molding the connecting members in an integral mass of insulation to produce a unit and thereafter inserting said unit in an inclosing shell and fashioning the latter to grip and reinforce the former.

2. The method of making an insulating joint of the character set forth, consisting in molding the connecting members in a mass of insulation to produce a unit and treating the insulation to harden the same and then inserting the unit in an inclosing shell and fashioning the latter to grip and reinforce the former.

3. The method of making an insulating joint of the character set forth, consisting in molding the connecting members and an end collar in a mass of insulation to produce a unit and thereafter inserting said unit in an inclosing shell and flanging the latter over said collar to snugly fit the same.

In witness whereof, I have hereunto subscribed my name.

FRANK E. LAYMAN.

Copies of this patent may be obtained for five cents each, by addressing the "Commissioner of Patents, Washington, D. C."